Oct. 8, 1929.  F. U. WINCHESTER  1,730,490
AIR COOLED WHEEL CONSTRUCTION
Filed Aug. 5, 1926
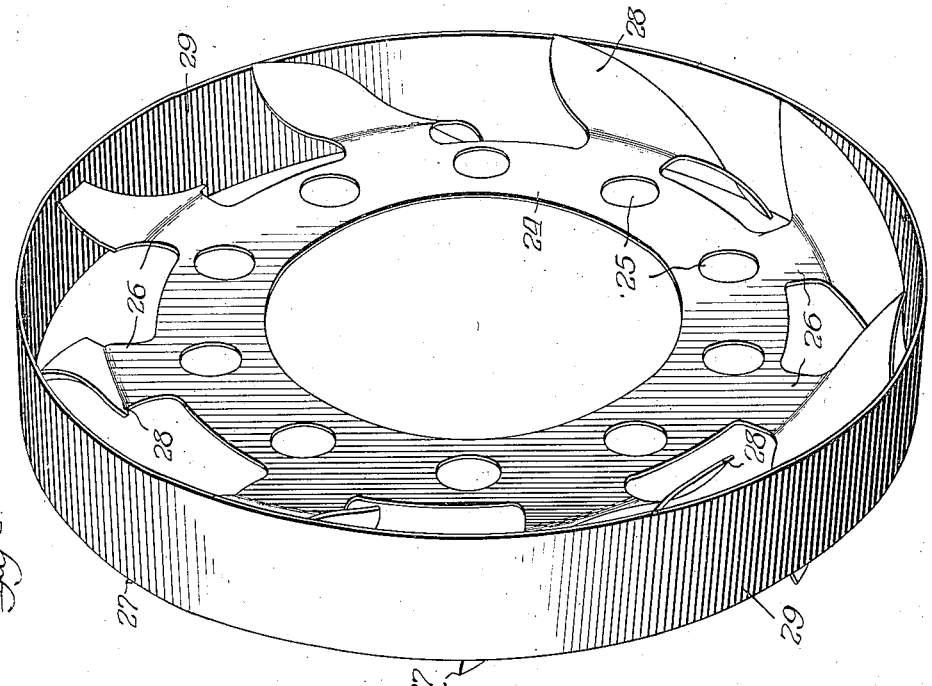
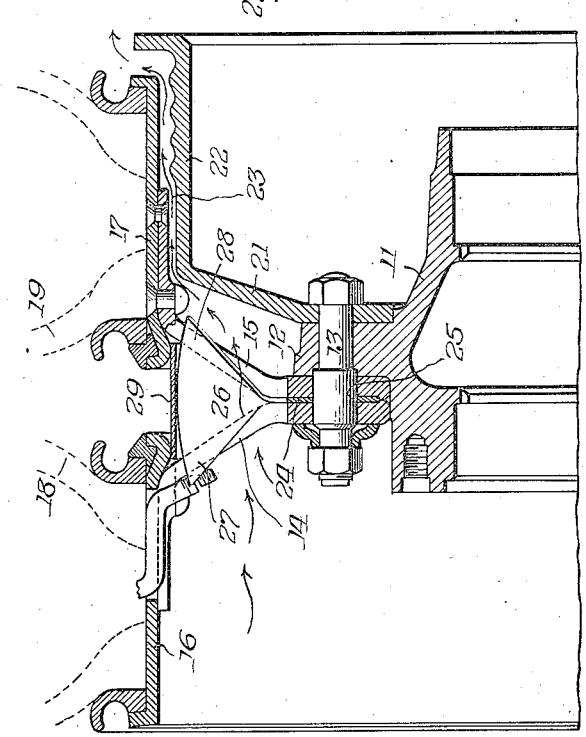
Inventor
F. U. Winchester Patented Oct. 8, 1929

1,730,490

UNITED STATES PATENT OFFICE

FRANK U. WINCHESTER, OF LANSING, MICHIGAN, ASSIGNOR, BY MESNE ASSIGN-MENTS, TO STEEL WHEEL CORPORATION OF LANSING, MICHIGAN, A CORPORATION OF MICHIGAN

AIR-COOLED-WHEEL CONSTRUCTION

Application filed August 5, 1926. Serial No. 127,232.

As wheel bodies become smaller in diameter with the adoption of balloon tires and brake drums become larger and heavier with increased weight of cars, the outer face of the braking flange of the drum more nearly approaches the inner face of the tire-carrying rim and the heat generated by the application of the brakes is more readily transmitted to the tire on the rim as the insulating air space between the drum and rim is decreased.

Particularly is this condition being aggravated in connection with the heavy dual wheels of busses and trucks, where in standard construction this air gap or interspace is reduced to a fraction of an inch in thickness, not more than ¼" in some cases.

Tests show that with frequent application of the brakes as in a hilly country a temperature of over 600° F. is developed in the brake drums of busses and the tire beads are heated to a temperature of from 300° F. to 400° F.

I propose to remedy this difficulty by utilizing a revolving wheel part to direct a blast of air upon the brake drum and through the space between the brake drum and the rim, thereby dissipating the heat generated by the brake and preventing its transmission to the rim and tire.

Preferably I associate with the wheel a fan disk, rotating therewith and having blades disposed at such advantageous oblique angle to the plane of wheel rotation that air is directed upon and over the brake drum.

In the case of a dual wheel construction, I find it desirable to mount the fan disk between the two wheel members, with the blades so obliquely disposed as to draw the air from the front through the spokes of the outer wheel and force it against the front web of the brake drum and around the drum flange through the air gap within the rim to a discharge at the rear side of the inner wheel.

In order that the invention and its application may be readily understood, I have, in the following specification and in the accompanying drawings, set forth a preferred embodiment thereof; it being made clear that the description and illustration are by way of exemplification only, and not to be taken as limiting the invention beyond the requirements of the prior art.

In the drawing—

Fig. 1 is a radial section through a standard dual wheel construction, illustrating the embodiment of my invention therein; and Fig. 2 is a detail perspective of the fan disk disassembled from the wheel.

Having reference, by way of explanation, to the drawing, the standard dual wheel construction there shown comprises the hub 11 with its flange 12 to which are secured by means of a series of bolts 13 the outer wheel 14 and the inner wheel 15. These wheels carry rims 16 and 17 respectively here shown as of the well known O. D. type, adapted to support pneumatic tires 18 and 19.

Also mounted upon the hub flange 12 by means of the bolts 13, is a brake drum having the rearwardly inclined front web 21 and a cylindrical braking flange 22 disposed within the rim 17 and closely adjacent the inner surface thereof, being separated therefrom by an annular air gap or space of but a fraction of an inch as indicated at 23.

In service, the frequent application of the brake causes the brake drum and particularly the flange 22 thereof to become heated by friction to such a high temperature as to affect injuriously the rubber tire mounted on the rim, and it is highly desirable to dissipate such heat rapidly as generated. To this end, I employ a fan disk comprising an annulus 24 provided with bolt apertures 25 to receive the bolts 13 and with radially projecting vanes 26 having their terminal portions 27 and 28 oppositely deflected at oblique angles to the plane of the disk, the several vanes encompassed and connected by a cylindrical band 29.

This fan disk is disposed between the wheel members 14 and 15 upon the bolt series 13 with the vane-encompassing band 29 bridging the space between the wheel rims 16 and 17.

It will thus be seen that a cylindrical space is closed off between the wheel members of the dual construction, and that, as the wheels and fan rotate in service, the vanes draw the air from the front through the outer wheel member and discharge an air blast to the rear over the brake drum web 20 and through the annular space 23, thus effectually cooling the brake flange 22 and the rim 17.

The employment of the band 29 may be dispensed with, where road conditions are not suitable, and measurably good results secured, though some of the air will be discharged radially where a spoke wheel body is used as here illustrated. With disk wheel dual construction, the omission of the band permits the air to flow radially toward the fan axis and then rearwardly over the brake drum as befor under the action of the vanes, the contour of which is such as to exert an inward and lateral thrust.

Obviously the construction as here illustrated and described is subject to modification by the skilled mechanic without departure from the essence of the invention.

I claim:

1. In a dual wheel construction, the combination with an outer wheel and an inner wheel mounted side by side, tire rims and tires on the two wheels, and a brake drum assembled in lateral relation to the inner wheel and within the rim thereof in annular spaced relation thereto, of a fan disk concentrically mounted between and in fixed relation to the outer and inner wheels and having vanes disposed at an oblique angle to the wheel plane to draw air from the front through the outer wheel and to discharge an air blast upon and around the brake drum towards the rear through the space between the drum and rim.

2. In a dual wheel construction, the combination with an outer wheel and an inner wheel mounted side by side, tire rims and tires on the two wheels, and a brake drum assembled in lateral relation to the inner wheel, of a fan disk concentrically mounted between and in fixed relation to the outer and inner wheel and having vanes disposed at an oblique angle with the wheel plane to draw air from the front through the outer wheel and to discharge an air blast upon and around the brake drum towards the rear, and a vane-encompassing band bridging the space between the rims of the two wheels whereby to confine the air blast against radial dissipation.

In testimony whereof I have hereunto subscribed my name.

FRANK U. WINCHESTER.